US012638935B2

(12) United States Patent
Lin et al.

(10) Patent No.: US 12,638,935 B2
(45) Date of Patent: May 26, 2026

(54) PANEL DEVICES

(71) Applicant: NOVATEK Microelectronics Corp.,
Hsin-Chu (TW)

(72) Inventors: Yi-Ying Lin, Hualien County (TW);
Chih-Chang Lai, Taichung City (TW)

(73) Assignee: NOVATEK Microelectronics Corp.,
Hsin-Chu (TW)

( * ) Notice: Subject to any disclaimer, the term of this
patent is extended or adjusted under 35
U.S.C. 154(b) by 0 days.

(21) Appl. No.: 19/008,596

(22) Filed: Jan. 2, 2025

(65) Prior Publication Data

US 2026/0118983 A1    Apr. 30, 2026

(30) Foreign Application Priority Data

Aug. 19, 2024    (TW) ................................. 113131062

(51) Int. Cl.
*G06F 3/041*         (2006.01)
*G06F 3/044*         (2006.01)
(52) U.S. Cl.
CPC ........ *G06F 3/0412* (2013.01); *G06F 3/04164*
(2019.05); *G06F 3/0446* (2019.05)
(58) Field of Classification Search
CPC .............................. G06F 3/0443; G06F 3/0446
See application file for complete search history.

(56) References Cited

U.S. PATENT DOCUMENTS 12,307,040 B2 *   5/2025  Wu ........................ H01L 24/05
2015/0220204 A1 *  8/2015  Noguchi ............. G06F 3/04184
                                                  345/174

FOREIGN PATENT DOCUMENTS

| CN | 114527888 A | 5/2022 |
| CN | 117971068 A | 5/2024 |
| TW | 202044003 A | 12/2020 |

* cited by examiner

*Primary Examiner* — Robin J Mishler
(74) *Attorney, Agent, or Firm* — Winston Hsu

(57)         ABSTRACT

A panel device includes a first touch senor pad and a second
touch sensor pad configured in a first region, a third touch
senor pad and a fourth touch sensor pad configured in a
second region, a plurality of traces, a first receiving circuit
and a second receiving circuit. The first receiving circuit and
the second receiving circuit respectively receives a first
sensing signal generated on the first touch sensor pad and a
second sensing signal generated on the second touch sensor
pad in a first sensing period, and respectively receives a third
sensing signal generated on the third touch sensor pad and
a fourth sensing signal generated on the fourth touch sensor
pad in a second sensing period. The first region and the
second region are comprised in a display area of the panel
device.

17 Claims, 8 Drawing Sheets

1

PANEL DEVICES

BACKGROUND OF THE INVENTION

1. Field of the Invention

The invention relates to a panel device, more particular to a panel device with improved sensing signal quality.

2. Description of the Prior Art

With the rapid development of technology, portable electronic devices have the advantages of light weight, thin thickness and low power consumption, and are widely used in many consumer electronic products, such as smart phones, tablet PC or laptop PC, etc.

In order to make users to operate the electronic devices in a more convenient way, display panels of the electronic devices are generally equipped with touch sensing and control functions nowadays. As the touch behavior is detected by sensing the capacitance change on the panel, the quality of the sensing signal is a key factor to affect the detection accuracy.

SUMMARY OF THE INVENTION

Therefore, how to improve the quality of sensing signals is an important issue in panel device design. According to an embodiment of the invention, a panel device comprises a first touch senor pad and a second touch sensor pad sequentially configured along a first direction in a first region of the panel device, a third touch senor pad and a fourth touch sensor pad sequentially configured along the first direction in a second region of the panel device, a plurality of traces extending along the first direction and transmitting a first sensing signal generated on the first touch senor pad, a second sensing signal generated on the second touch senor pad, a third sensing signal generated on the third touch senor pad and a fourth sensing signal generated on the fourth touch senor pad, a first receiving circuit and a second receiving circuit. The traces comprise a first trace, a second trace, a third trace and a fourth trace sequentially configured along a second direction. The first receiving circuit receives the first sensing signal in a first sensing period and receives the third sensing signal in a second sensing period. The second receiving circuit receives the second sensing signal in the first sensing period and receives the fourth sensing signal in the second sensing period. The first region and the second region are comprised in a display area of the panel device.

According to an embodiment of the invention, a panel device comprises a sensor array in a display area of the panel device and comprising a plurality of touch sensor pads arranged in a plurality of columns and a plurality of rows, a first receiving circuit and a second receiving circuit. The touch sensor pads comprise a first group of touch sensor pads configured in a first region and a second group of touch sensor pads configured in a second region. The first group of touch sensor pads and the second group of touch sensor pads are located in a first column of the sensor array and sequentially configured along a first direction. The first receiving circuit and the second receiving circuit respectively receives a first sensing signal and a second sensing signal generated in the first region in a first sensing period, and the first receiving circuit and the second receiving circuit respectively receives a third sensing signal and a fourth sensing signal generated in the second region in a second sensing period.

According to an embodiment of the invention, a panel device comprises a sensor array in a display area of the panel device and comprising a plurality of touch sensor pads arranged in a plurality of columns and a plurality of rows, a plurality of traces extending along a first direction and transmitting a plurality of sensing signals generated on the touch senor pads, a first N-to-1 multiplexer comprising an output terminal and N input terminals coupled to different traces, a second N-to-1 multiplexer comprising an output terminal and N input terminals coupled to different traces, a first receiving circuit coupled to the output terminal of the first N-to-1 multiplexer; and a second receiving circuit coupled to the output terminal of the second N-to-1 multiplexer. N is a positive integer greater than 1. The touch sensor pads comprise N groups of touch sensor pads sequentially configured in different regions along the first direction, each group of touch sensor pads is configured in a corresponding region, the first receiving circuit and the second receiving circuit respectively receives the sensing signals generated on the touch sensor pads of different groups in different sensing periods through the first N-to-1 multiplexer and the second N-to-1 multiplexer, and the first receiving circuit and the second receiving circuit respectively receives the sensing signals generated on the touch sensor pads of a same group in a same sensing period through the first N-to-1 multiplexer and the second N-to-1 multiplexer.

These and other objectives of the present invention will no doubt become obvious to those of ordinary skill in the art after reading the following detailed description of the preferred embodiment that is illustrated in the various figures and drawings.

DETAILED DESCRIPTION

With the advance in technologies of display panels, the resolution of the display panels continues to increase, and the number of circuits required for processing the display and touch sensing signal increases as well. To reduce the area occupied by the circuits, several solutions with simplified circuits have been developed. However, the continuity of the sensing signals will be affected easily when the simplified circuits are applied, causing the value or the value change of the sensing signal becomes discontinuous.

In the following embodiments, a novel circuit structure of a panel device, including the configuration of vias and the design of panel wiring, is proposed. Compared with the existing circuit design of the panel devices, the proposed circuit structure effectively improves the continuity of the sensing signals, thereby improving the quality of the sensing signal.

Figure 1:
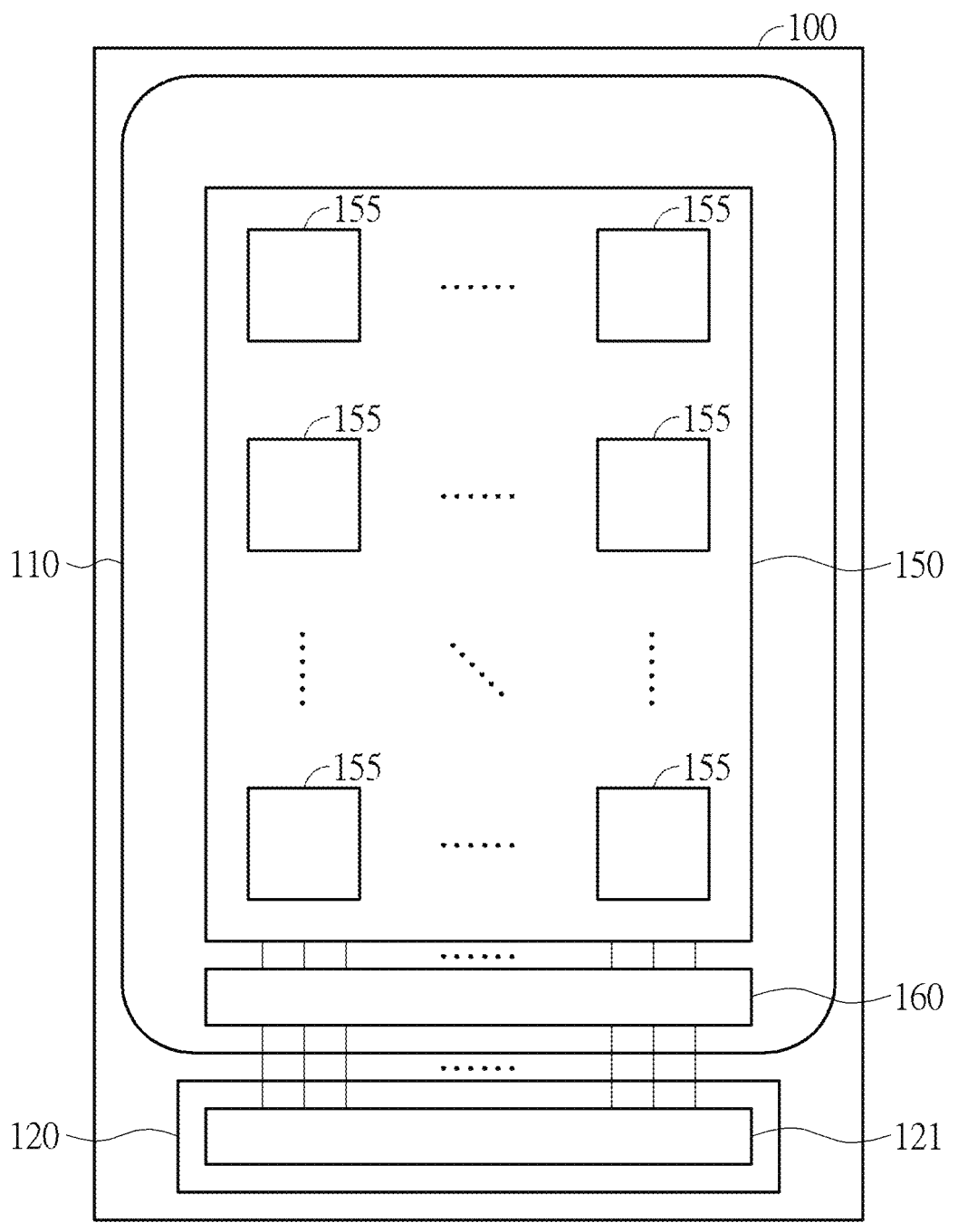
FIG. 1 is a schematic diagram of a panel device according to an embodiment of the invention.

FIG. 1 is a schematic diagram of a panel device according to an embodiment of the invention. The panel device 100 may be applied in an electronic device or a portable device, such as a notebook computer, a tablet, a mobile phone, a display device, or the likes. The panel device 100 may comprise a display panel 110 and a circuit board 120. In one embodiment, the circuit board 120 is implemented by a flexible printed circuit board. The display panel 110 may comprise a display area 150 and a non-display area. The display area 150, known as the active area, is the section of the panel device's screen where images are displayed. The regions other than the display area 150 on the display panel 110 may belong to the non-display area. The non-display area refers to the region of the panel device that does not display images, and may comprise the border area of the display panel 110. The fan-out area 160 may be located in the non-display area of the display panel 110, and the signal transmission between the display panel 110 and the circuit board 120 may be completed by the wiring of a layout of the fan-out area 160.

According to an embodiment of the invention, the display panel 110 is a touch-controlled panel, and the control circuit 121 may be a circuit for controlling the operations of display and touch-sensing of the display panel 110. The control circuit 121 may further control the displaying of the display panel 110 according to the touch-sensing result. According to different embodiments of the invention, the control circuit 121 may be configured on the circuit board 120, or may be configured within the region of the display panel 110 instead of the circuit board 120. The invention is not limited to any specific way of implementation.

In an embodiment of the invention, the control circuit 121 may be an integrated chip, such as a Touch with Display Driver Integration (TDDI) chip. It is to be noted that in some embodiments of the invention, there may be more than one control circuit or more than one chip configured on the circuit board 120 or configured within the region of the display panel 110. For example, the panel device 100 may comprise a plurality of light sensors, and an Ambient Light Sensor (ALS) driving chip may be configured on the circuit board 120 to control the operations of ambient light sensing, and to control the display operations of the display panel 110 according to the ambient light sensing result.

According to an embodiment of the invention, the panel device 100 may comprise a sensor array. The sensor array may comprise a plurality of touch sensor pads 155 arranged in a plurality of columns and a plurality of rows. According to an embodiment of the invention, the touch sensor pads 155 may be capacitive touch sensing elements, or may be named as capacitive touch sensor pads. Each touch sensor pad may correspond to a sensing area of the display panel, for sensing the coupling capacitance generated in the corresponding area. The control circuit 121 may receive a plurality of sensing signals generated on the touch sensor pads 155, and these sensing signals may reflect the amount of coupling capacitance sensed by the corresponding touch sensor pads 155. By monitoring changes in capacitance, the control circuit 121 may determine whether the display panel is touched.

The control circuit 121 may comprise a plurality of receiving circuits, and the receiving circuits may receive the aforementioned sensing signals through corresponding receiving pins. According to an embodiment of the invention, in order to reduce the number of traces in the border area as well as reduce the number of receiving circuits and receiving pins, each receiving circuit may be shared by multiple touch sensor pads 155, and one or more touch pad (TP) multiplexers (TPMUX) may be configured in the fan-out area 160 of the panel device 100 to switch the electrical connections between the receiving circuits and different touch sensor pads. According to an embodiment of the invention, the multiplexer may be an N-to-1 multiplexer, and may comprise N input terminals and 1 output terminal, to implement the circuit structure of sharing one receiving pin and one receiving circuit by N touch sensor pads, where N is a positive integer and is normally greater than 1. The input terminals of the multiplexer may be coupled to different traces and the output terminal thereof may be coupled to the corresponding receiving pin and receiving circuit, for the receiving circuits to sequentially receive the sensing signals generated on different touch sensor pad.

Since the panel device 100 has display and touch-controlled capabilities, the operation timing of the panel device 100 may comprise a display interval to perform display driving and a touch sensing interval to perform touch sensing. According to an embodiment of the invention, the touch sensing interval of the panel device 100 may be divided into a plurality of sensing periods. For example, a touch sensing interval may comprise N sensing periods. Through the switching operation of the multiplexer, the receiving circuit may be coupled to different touch sensor pads in different sensing periods to receive corresponding sensing signals.

According to an embodiment of the invention, to improve the continuity of the sensing signals, the touch sensor pads that are coupled to the corresponding receiving circuits to perform the touch sensing operation in the same sensing period may be arranged at adjacent positions in the display area 150. According to an embodiment of the invention, the display area 150 of the display panel 110 may be divided into a plurality of regions, and the touch sensor pads configured in the same region may be coupled to their corresponding receiving circuits in the same sensing period, and their touch sensing operations can be performed at the same time (i.e., in the same sensing period) on the corresponding sensing area.

Since there may be a significant difference in the amount of noise on the panel at different time, if the touch sensor pads located in adjacent positions are coupled to their corresponding receiving circuits in different sensing periods, discontinuous characteristics may appear in the value or the value change of the resulting sensing signals, resulting in generating the sensing results with noise interspersed on the panel. Therefore, in the embodiments of the invention, by modifying the circuit structure of the panel device, the touch sensor pads configured in the same region or in adjacent with each other may be coupled to their receiving circuits in the same sensing period, and their touch sensing operations can be performed at the same time (i.e., in the same sensing period) on the corresponding sensing area. In this manner, the continuity of the sensing signals can be effectively improved.

The embodiments of proposed circuit structure of a panel device may be divided into two aspects. The first aspect of the invention comprises several embodiments of using via configurations to improve the continuity of the sensing signals. The second aspect of the invention comprises several embodiments of using the trace structure in fan-out area to improve the continuity of the sensing signals.

Figure 2:
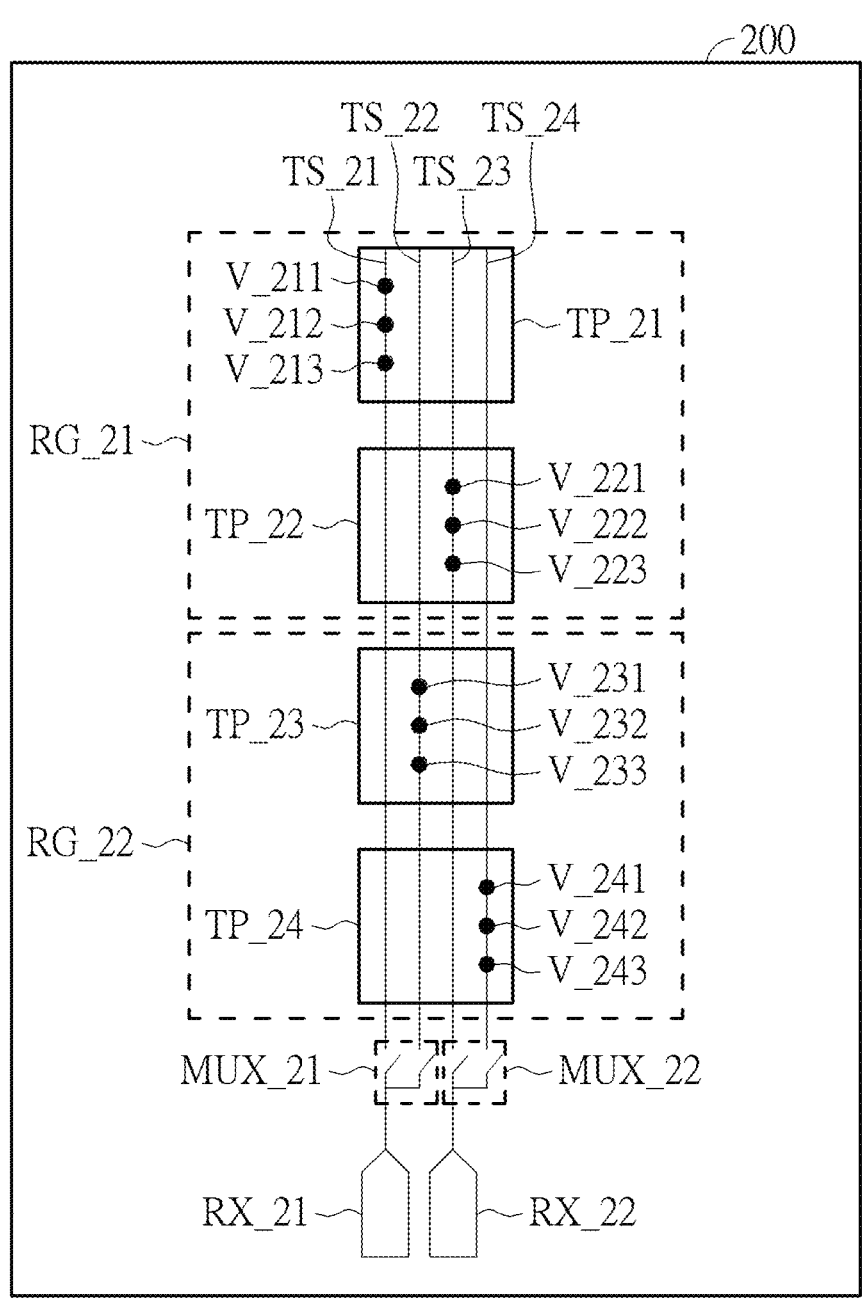
FIG. 2 is a schematic diagram of a panel device according to an embodiment in the first aspect of the invention.

FIG. 2 is a schematic diagram of a panel device according to an embodiment in the first aspect of the invention. The panel device 200 may have the same components as the panel device 100. That is, the panel device 200 may comprise a display panel, a circuit board, a display area, a fan-out area and a control circuit, etc. as shown in FIG. 1.

The panel device 200 may comprise a plurality of touch sensor pads arranged in a plurality of columns and a plurality of rows, forming a sensor array. To simplify the illustration, one column of the sensor array is shown in FIG. 2. Those of ordinary skill in the art will be readily appreciated that a sensor array may comprise more than one column of touch sensor pads. In addition, although the circuits and touch sensing operations of one column of touch sensor pads will be introduced in the following embodiments, it will no doubt become obvious to those of ordinary skill in the art after reading the following detailed description of the embodiments to deduce the circuits and touch sensing operations of the touch sensor pads in other columns of the sensor array, including the via configurations and the sequence of sensing signal transmission, and also the others.

According to an embodiment of the invention the touch sensor pads comprise a first group of touch sensor pads configured in a first region and a second group of touch sensor pads configured in a second region. The first group of touch sensor pads and the second group of touch sensor pads may respectively comprise a plurality of touch sensor pads arranged in adjacent rows of the sensor array. For example, the first group of touch sensor pads may comprise the touch sensor pads TP_21 and TP_22 configured in the region RG_21, the second group of touch sensor pads may comprise the touch sensor pads TP_23 and TP_24 configured in the region RG_22, wherein the touch sensor pads TP_21, TP_22, TP_23 and TP_24 may be located in the same column (e.g., the first column) of the sensor array, and may be sequentially configured along a first direction. According to an embodiment of the invention, the first direction may be a column direction or a vertical direction on the drawing. For example, the touch sensor pad TP_21 may be located in the first column and the first row of the sensor array, the touch sensor pad TP_22 may be located in the first column and the second row of the sensor array, the touch sensor pad TP_23 may be located in the first column and the third row of the sensor array and the touch sensor pad TP_24 may be located in the first column and the fourth row of the sensor array.

The panel device 200 may further comprise a plurality of receiving circuits in the control circuit, such as receiving circuits RX_21 and RX_22, and a plurality of traces extending along the first direction for transmitting sensing signals generated on the touch sensor pads, such as traces TS_21, TS_22, TS_23 and TS_24. According to an embodiment of the invention, the traces TS_21, TS_22, TS_23 and TS_24 may be sequentially configured along a second direction. The second direction may be a row direction or a horizontal direction on the drawing, and the second direction may be perpendicular to the first direction.

The panel device 200 may further comprise multiplexers MUX_21 and MUX_22. In this embodiment, the multiplexers MUX_21 and MUX_22 may be 2-to-1 multiplexers, that is, N=2, and a touch sensing interval may comprise 2 sensing periods. The multiplexer MUX_21 may selectively couple one of the trace TS_21 and the trace TS_22 to the receiving circuit RX_21 in different sensing periods in response to a control signal issued by the control circuit. Similarly, the multiplexer MUX_22 may selectively couple one of the trace TS_23 and the trace TS_24 to the receiving circuit RX_22 in different sensing periods in response to the control signal issued by the control circuit.

In this embodiment, through the switching of the multiplexer MUX_21, the receiving circuit RX_21 may receive the first sensing signal generated on the touch sensor pad TP_21 (that is, generated in the region RG_21) in the first sensing period and receive the third sensing signal generated on the touch sensor pad TP_23 (that is, generated in the region RG_22) in the second sensing period. Similarly, through the switching of the multiplexer MUX_22, the receiving circuit RX_22 may receive the second sensing signal generated on the touch sensor pad TP_22 (that is, generated in the region RG_21) in the first sensing period and receive the fourth sensing signal generated on the touch sensor pad TP_24 (that is, generated in the region RG_22) in the second sensing period.

According to an embodiment of the invention, to improve the continuity of the sensing signal received by the control circuit, for the touch sensor pads in the same group, the vias corresponding to adjacent touch sensor pads or the touch sensor pads located in adjacent rows may be configured on non-adjacent traces, wherein the via corresponding to a touch sensor pad may be utilized to couple or electrically connect the touch sensor pad to a trace, and the via may be a drilled hole, a conductive hole, or a metal channel.

According to an embodiment of the invention, when a touch sensing interval of the panel device comprises N sensing periods, configurations of the vias corresponding to two touch sensor pads that are adjacent to each other and belonging to the same group of touch sensor pads may be spaced by (N−1) of the traces. For example, configurations of the via corresponding to the touch sensor pad TP_21 and the via corresponding to the touch sensor pad TP_22 may be spaced by one trace. Similarly, configurations of the via corresponding to the touch sensor pad TP_23 and the via corresponding to the touch sensor pad TP_24 may be spaced by one trace.

To be more specific, the vias V_211, V_212 and V_213 corresponding to the touch sensor pad TP_21 may be configured on the trace TS_21, the touch sensor pad TP_21 may be coupled to the trace TS_21 through the corresponding vias V_211, V_212 and V_213, and the first sensing signal generated on the touch sensor pad TP_21 may be transmitted to the receiving circuit RX_21 through the trace TS_21.

Similarly, the vias V_221, V_222 and V_223 corresponding to the touch sensor pad TP_22 may be configured on the trace TS_23, the touch sensor pad TP_22 may be coupled to the trace TS_23 through the corresponding vias V_221, V_222 and V_223, and the second sensing signal generated on the touch sensor pad TP_22 may be transmitted to the receiving circuit RX_22 through the trace TS_23.

Similarly, the vias V_231, V_232 and V_233 corresponding to the touch sensor pad TP_23 may be configured on the trace TS_22, the touch sensor pad TP_23 may be coupled to the trace TS_22 through the corresponding vias V_231, V_232 and V_233, and the third sensing signal generated on the touch sensor pad TP_23 may be transmitted to the receiving circuit RX_21 through the trace TS_22. The vias V_241, V_242 and V_243 corresponding to the touch sensor pad TP_24 may be configured on the trace TS_24, the touch sensor pad TP_24 may be coupled to the trace TS_24 through the corresponding vias V_241, V_242 and V_243, and the fourth sensing signal generated on the touch sensor pad TP_24 may be transmitted to the receiving circuit RX_22 through the trace TS_24.

Therefore, in this embodiment, the multiplexer MUX_21 may selectively couple one of the traces TS_21 and TS_22 to the receiving circuit RX_21 in different sensing periods in response to the control signal, and the multiplexer MUX_22 may selectively couple one of the traces TS_23 and TS_24 to the receiving circuit RX_22 in different sensing periods in response to the control signal.

It is to be noted that the number of vias shown in FIG. 2 (as well as in the subsequent figures) is merely an example to illustrate the invention, and is not a limit to the invention. In the embodiments of the invention, the number of vias configured corresponding to a touch sensor pad (and a trace) may be more than or less than 3.

In the embodiments of the invention, the touch sensor pads configured in the same region may be coupled to their corresponding receiving circuit in the same sensing period, and their touch sensing operations can be performed at the same time (i.e., in the same sensing period) on the corresponding sensing area. In this manner, the continuity of the sensing signals can be effectively improved.

Figure 3:
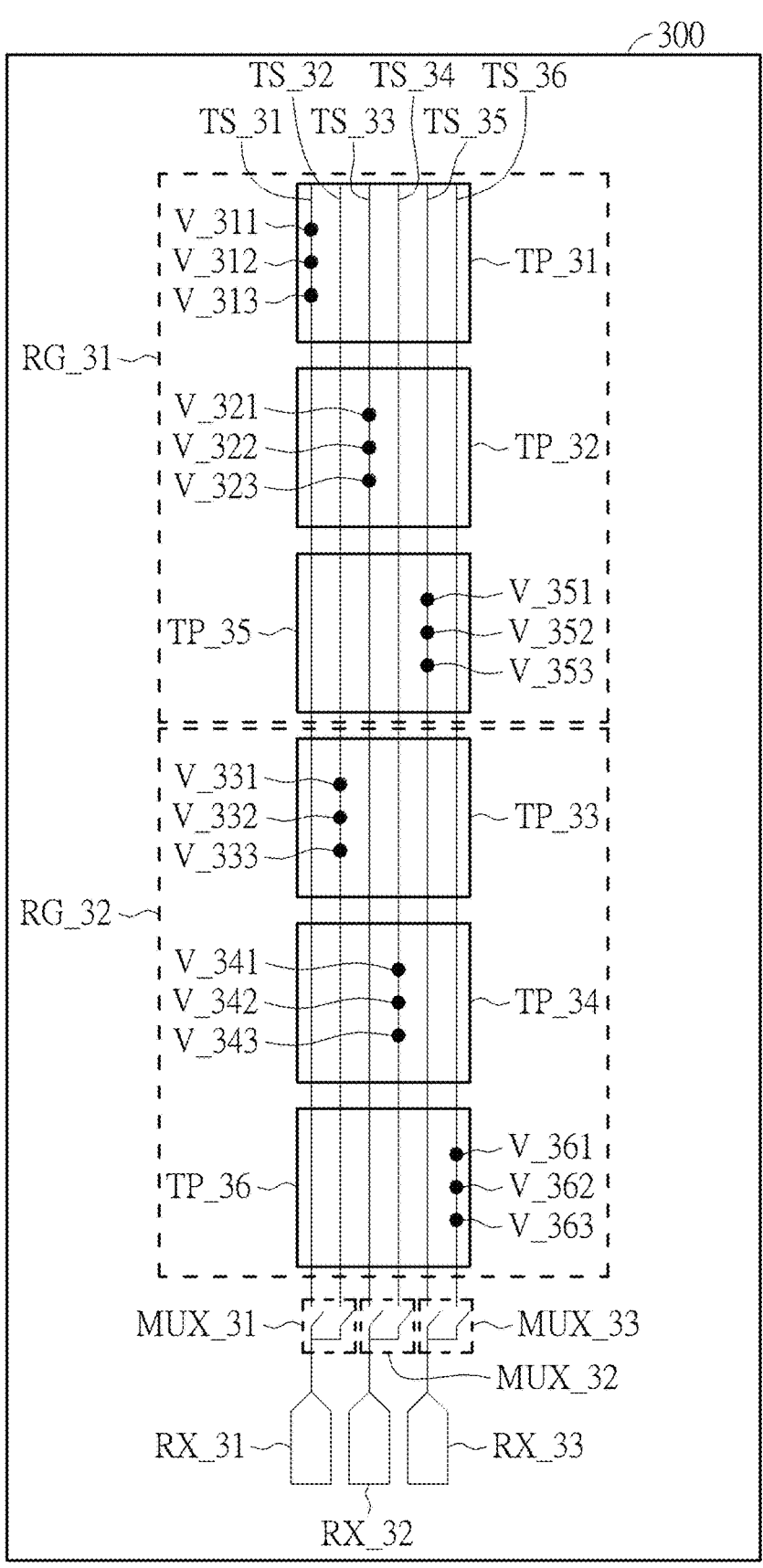
FIG. 3 is a schematic diagram of a panel device according to another embodiment in the first aspect of the invention.

FIG. 3 is a schematic diagram of a panel device according to another embodiment in the first aspect of the invention. The panel device 300 may have the same components as the panel device 100, that is, the panel device 300 may comprise a display panel, a circuit board, a display area, a fan-out area and a control circuit, etc. as shown in FIG. 1.

In this embodiment, the multiplexers MUX_31, MUX_32 and MUX_33 may be 2-to-1 multiplexers, that is, N=2, and a touch sensing interval may comprise 2 sensing periods. The main difference between FIG. 3 and FIG. 2 is the number of components. Therefore, the descriptions regarding the regions RG_31 and RG_32, the touch sensor pads TP_31, TP_32, TP_33 and TP_34, the traces TS_31, TS_32, TS_33 and TS_34, the multiplexers MUX_31 and MUX_32, the receiving circuits RX_31 and RX_32, and the vias V_311, V_312, V_313, V_321, V_322, V_323, V_331, V_332, V_333, V_341, V_342 and V_343, reference may be made to the descriptions regarding the regions RG_21 and RG_22, the touch sensor pads TP_21, TP_22, TP_23 and TP_24, the traces TS_21, TS_22, TS_23 and TS_24, the multiplexers MUX_21 and MUX_22, the receiving circuits RX_21 and RX_22, and the vias V_211, V_212, V_213, V_221, V_222, V_223, V_231, V_232, V_233, V_241, V_242 and V_243 shown in FIG. 2, and are omitted here for brevity.

In this embodiment, the panel device 300 may further comprise a touch sensor pad TP_35 located in the first column of the sensor array and configured in the region RG_31, a touch sensor pad TP_36 located in the first column of the sensor array and configured in the region RG_32, vias V_351, V_352 and V_353 corresponding to the touch sensor pad TP_35, and vias V_361, V_362 and V_363 corresponding to the touch sensor pad TP_36. In addition, the panel device 300 may further comprise traces TS_35 and TS_36, a receiving circuit RX_33 and a multiplexer MUX_33.

According to an embodiment of the invention, the multiplexer MUX_33 may selectively couple one of the traces TS_35 and TS_36 to the receiving circuit RX_33 in different sensing periods in response to the control signal. Through the switching of the multiplexer MUX_33, the receiving circuit RX_33 may receive the fifth sensing signal generated on the touch sensor pad TP_35 (that is, generated in the region RG_31) in the first sensing period and receive the sixth sensing signal generated on the touch sensor pad TP_36 (that is, generated in the region RG_32) in the second sensing period.

According to an embodiment of the invention, the traces TS_35 and TS_36 may be consecutively configured following the traces TS_31-TS_34 along the second direction. The touch sensor pad TP_35 may be coupled to the trace TS_35 through the vias V_351, V_352 and V_353, and the touch sensor pad TP_36 may be coupled to the trace TS_36 through the vias V_361, V_362 and V_363.

In the embodiments of the invention, the touch sensor pads configured in the same region may be coupled to their corresponding receiving circuit in the same sensing period, and their touch sensing operations can be performed at the same time (i.e., in the same sensing period) on the corresponding sensing area. In this manner, the continuity of the sensing signals can be effectively improved.

Figure 4:
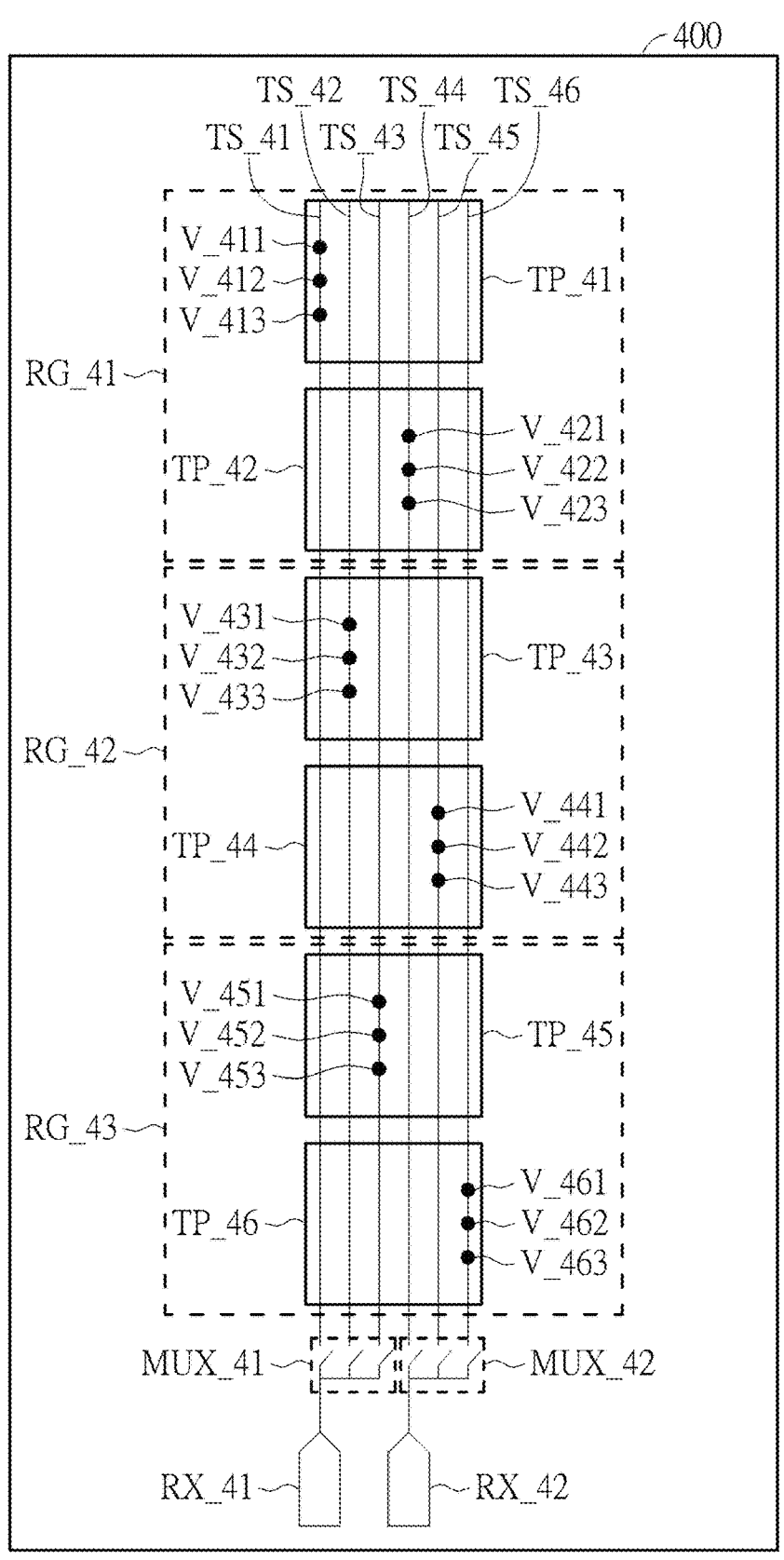
FIG. 4 is a schematic diagram of a panel device according to yet another embodiment in the first aspect of the invention.

FIG. 4 is a schematic diagram of a panel device according to yet another embodiment in the first aspect of the invention. The panel device 400 may comprise a plurality of touch sensor pads arranged in a plurality of columns and a plurality of rows, forming a sensor array, and may have the same components as the panel device 100. That is, the panel device 400 may comprise a display panel, a circuit board, a display area, a fan-out area and a control circuit, etc. as shown in FIG. 1. To simplify the illustration, FIG. 4 only shows one column of the sensor array, and the circuits and touch sensing operations of this column of touch sensor pads will be introduced in the following embodiments. It will no doubt become obvious to those of ordinary skill in the art after reading the following detailed description of the embodiments to deduce the circuits and touch sensing operations of the touch sensor pads in other columns of the sensor array, including the via configurations and the sequence of sensing signal transmission, and also the others.

According to an embodiment of the invention, the touch sensor pads may at least comprise a first group of touch sensor pads configured in a first region, a second group of touch sensor pads configured in a second region and a third group of touch sensor pads configured in a third region. According to an embodiment of the invention, the first group of touch sensor pads, the second group of touch sensor pads and the third group of touch sensor pads may respectively comprise a plurality of touch sensor pads arranged in adjacent rows of the sensor array. For example, as shown in FIG. 4, the first group of touch sensor pads may comprise the touch sensor pads TP_41 and TP_42 configured in the region RG_41, the second group of touch sensor pads may comprise the touch sensor pads TP_43 and TP_44 configured in the region RG_42, and the third group of touch sensor pads may comprise the touch sensor pads TP_45 and TP_46 configured in the region RG_43.

The touch sensor pads TP_41, TP_42, TP_43, TP_44, TP_45 and TP_46 may be located in the same column (e.g., the first column) of the sensor array, and may be sequentially configured along a first direction, where the first direction may be a column direction or a vertical direction on the drawing. For example, the touch sensor pad TP_41 may be located in the first column and the first row of the sensor array, the touch sensor pad TP_42 may be located in the first column and the second row of the sensor array, the touch sensor pad TP_43 may be located in the first column and the third row of the sensor array, the touch sensor pad TP_44 may be located in the first column and the fourth row of the sensor array, the touch sensor pad TP_45 may be located in the first column and the fifth row of the sensor array and the touch sensor pad TP_46 may be located in the first column and the sixth row of the sensor array.

The panel device 400 may further comprise a plurality of receiving circuits in the control circuit, such as receiving circuits RX_41 and RX_42, and a plurality of traces extending along the first direction for transmitting sensing signals generated on the touch sensor pads, such as traces TS_41, TS_42, TS_43, TS_44, TS_45 and TS_46. According to an embodiment of the invention, the traces TS_41, TS_42, TS_43, TS_44, TS_45 and TS_46 may be sequentially configured along a second direction. The second direction may be a row direction or a horizontal direction on the drawing, and the second direction may be perpendicular to the first direction.

The panel device 400 may further comprise multiplexers MUX_41 and MUX_42. In this embodiment, the multiplexers MUX_41 and MUX_42 may be 3-to-1 multiplexers, that is, N=3, and a touch sensing interval may comprise 3 sensing periods. The multiplexer MUX_41 may selectively couple one of the trace TS_41, the trace TS_42 and the trace TS_43 to the receiving circuit RX_41 in different sensing periods in response to a control signal issued by the control circuit. Similarly, the multiplexer MUX_42 may selectively couple one of the trace TS_44, the trace TS_45 and the trace TS_46 to the receiving circuit RX_42 in different sensing periods in response to the control signal issued by the control circuit.

In this embodiment, through the switching of the multiplexer MUX_41, the receiving circuit RX_41 may receive the first sensing signal generated on the touch sensor pad TP_41 (that is, generated in the region RG_41) in the first sensing period, receive the third sensing signal generated on the touch sensor pad TP_43 (that is, generated in the region RG_42) in the second sensing period and receive the fifth sensing signal generated on the touch sensor pad TP_45 (that is, generated in the region RG_43) in the third sensing period. Similarly, through the switching of the multiplexer MUX_42, the receiving circuit RX_42 may receive the second sensing signal generated on the touch sensor pad TP_42 (that is, generated in the region RG_41) in the first sensing period, receive the fourth sensing signal generated on the touch sensor pad TP_44 (that is, generated in the region RG_42) in the second sensing period and receive the sixth sensing signal generated on the touch sensor pad TP_46 (that is, generated in the region RG_43) in the third sensing period.

According to an embodiment of the invention, to improve the continuity of the sensing signal received by the control circuit, for the touch sensor pads in the same group, the vias corresponding to adjacent touch sensor pads or touch sensor pads located in adjacent rows may be configured on non-adjacent traces.

As described above, when the multiplexers are N-to-1 multiplexers, a touch sensing interval of the panel device comprises N sensing periods, and configurations of the vias corresponding to two touch sensor pads that are adjacent to each other and belonging to the same group of touch sensor pads may be spaced by (N−1) of the traces. In this example, configurations of the via corresponding to the touch sensor pad TP_41 and the via corresponding to the touch sensor pad TP_42 may be spaced by two traces. Similarly, configurations of the via corresponding to the touch sensor pad TP_43 and the via corresponding to the touch sensor pad TP_44 may be spaced by two traces, and configurations of the via corresponding to the touch sensor pad TP_45 and the via corresponding to the touch sensor pad TP_46 may be spaced by two traces.

To be more specific, the vias V_411, V_412 and V_413 corresponding to the touch sensor pad TP_41 may be configured on the trace TS_41, the touch sensor pad TP_41 may be coupled to the trace TS_41 through the corresponding vias V_411, V_412 and V_413, and the first sensing signal generated on the touch sensor pad TP_41 may be transmitted to the receiving circuit RX_41 through the trace TS_41.

Similarly, the vias V_421, V_422 and V_423 corresponding to the touch sensor pad TP_42 may be configured on the trace TS_44, the touch sensor pad TP_42 may be coupled to the trace TS_44 through the corresponding vias V_421, V_422 and V_423, and the second sensing signal generated on the touch sensor pad TP_42 may be transmitted to the receiving circuit RX_42 through the trace TS_44.

Similarly, the vias V_431, V_432 and V_433 corresponding to the touch sensor pad TP_43 may be configured on the trace TS_42, the touch sensor pad TP_43 may be coupled to the trace TS_42 through the corresponding vias V_431, V_432 and V_433, and the third sensing signal generated on the touch sensor pad TP_43 may be transmitted to the receiving circuit RX_41 through the trace TS_42.

The vias V_441, V_442 and V_443 corresponding to the touch sensor pad TP_44 may be configured on the trace TS_45, the touch sensor pad TP_44 may be coupled to the trace TS_45 through the corresponding vias V_441, V_442 and V_443, and the fourth sensing signal generated on the touch sensor pad TP_44 may be transmitted to the receiving circuit RX_42 through the trace TS_45.

The vias V_451, V_452 and V_453 corresponding to the touch sensor pad TP_45 may be configured on the trace TS_43, the touch sensor pad TP_45 may be coupled to the trace TS_43 through the corresponding vias V_451, V_452 and V_453, and the fifth sensing signal generated on the touch sensor pad TP_45 may be transmitted to the receiving circuit RX_41 through the trace TS_43.

The vias V_461, V_462 and V_463 corresponding to the touch sensor pad TP_46 may be configured on the trace TS_46, the touch sensor pad TP_46 may be coupled to the trace TS_46 through the corresponding vias V_461, V_462 and V_463, and the sixth sensing signal generated on the touch sensor pad TP_46 may be transmitted to the receiving circuit RX_42 through the trace TS_46.

Therefore, in this embodiment, the multiplexer MUX_41 may selectively couple one of the traces TS_41, TS_42 and TS_43 to the receiving circuit RX_41 in different sensing periods in response to the control signal, and the multiplexer MUX_42 may selectively couple one of the traces TS_44, TS_45 and TS_46 to the receiving circuit RX_42 in different sensing periods in response to the control signal.

In the embodiments of the invention, the touch sensor pads configured in the same region may be coupled to their corresponding receiving circuit in the same sensing period, and their touch sensing operations can be performed at the same time (i.e., in the same sensing period) on the corresponding sensing area. In this manner, the continuity of the sensing signals can be effectively improved.

In addition, the embodiments in the first aspect of the invention do not need to change the routing of the traces in the fan-out area, nor does it need to change the design of the multiplexer, even nor does it affect the design and width of the border area.

Figure 5:
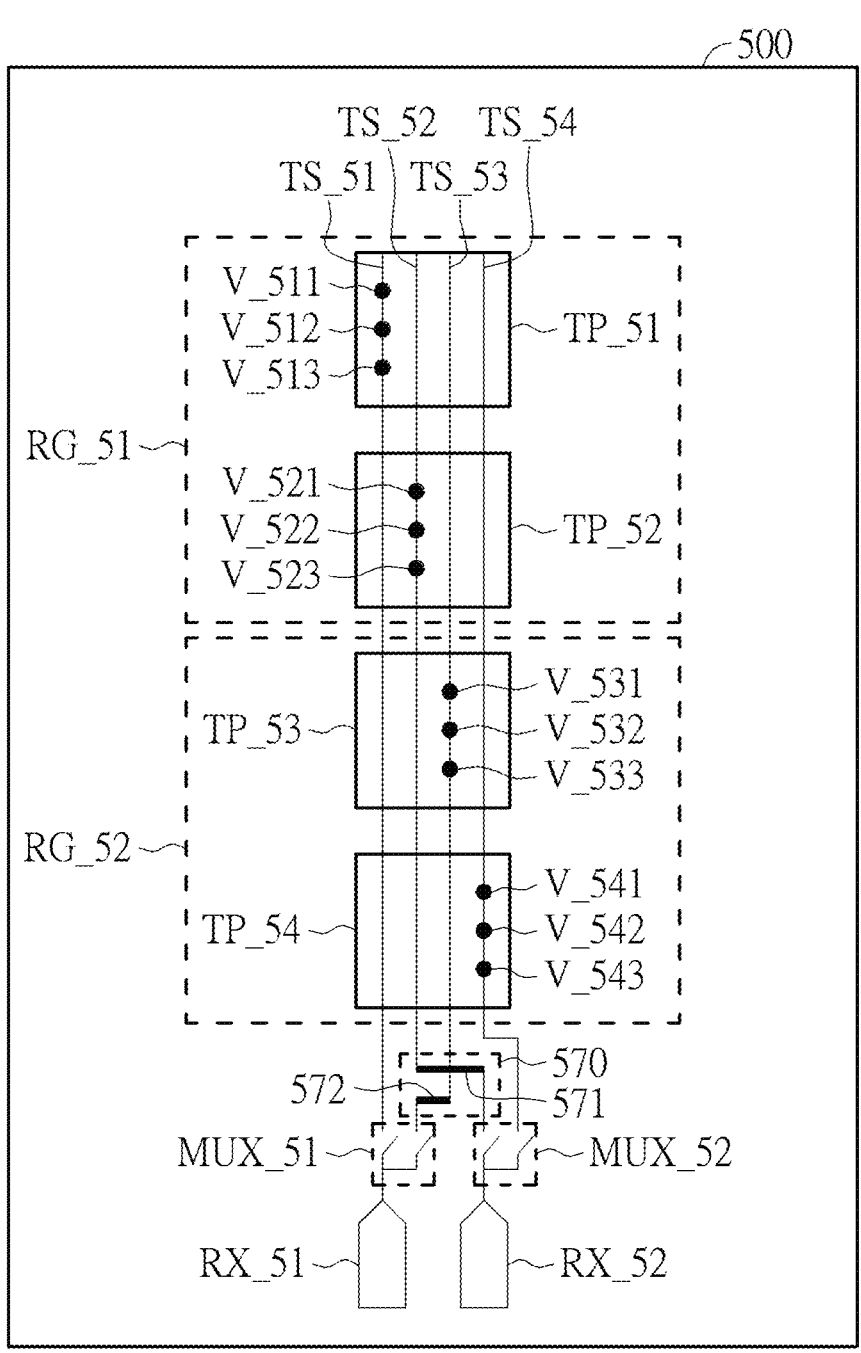
FIG. 5 is a schematic diagram of a panel device according to an embodiment in the second aspect of the invention.

FIG. 5 is a schematic diagram of a panel device according to an embodiment in the second aspect of the invention. The panel device 500 may comprise a plurality of touch sensor pads arranged in a plurality of columns and a plurality of rows, forming a sensor array, and may have the same components as the panel device 100. That is, the panel device 500 may comprise a display panel, a circuit board, a display area, a fan-out area and a control circuit, etc. as shown in FIG. 1. To simplify the illustration, FIG. 5 only shows one column of the sensor array, and the circuits and touch sensing operations of this column of touch sensor pads will be introduced in the following embodiments. It will no doubt become obvious to those of ordinary skill in the art after reading the following detailed description of the embodiments to deduce the circuits and touch sensing operations of the touch sensor pads in other columns of the sensor array, including the via configurations and the sequence of sensing signal transmission, and also the others.

According to an embodiment of the invention, the touch sensor pads may at least comprise a first group of touch sensor pads configured in a first region and a second group of touch sensor pads configured in a second region. The first group of touch sensor pads and the second group of touch sensor pads may respectively comprise a plurality of touch sensor pads arranged in adjacent rows of the sensor array. For example, as shown in FIG. 5, the first group of touch sensor pads may comprise the touch sensor pads TP_51 and TP_52 configured in the region RG_51, the second group of touch sensor pads may comprise the touch sensor pads TP_53 and TP_54 configured in the region RG_52, wherein the touch sensor pads TP_51, TP_52, TP_53 and TP_54 may be located in the same column (e.g., the first column) of the sensor array, and may be sequentially configured along a first direction. According to an embodiment of the invention, the first direction may be a column direction or a vertical direction on the drawing. For example, the touch sensor pad TP_51 may be located in the first column and the first row of the sensor array, the touch sensor pad TP_52 may be located in the first column and the second row of the sensor array, the touch sensor pad TP_53 may be located in the first column and the third row of the sensor array and the touch sensor pad TP_54 may be located in the first column and the fourth row of the sensor array.

The panel device 500 may further comprise a plurality of receiving circuits, such as receiving circuits RX_51 and RX_52, in the control circuit and a plurality of traces, such as traces TS_51, TS_52, TS_53 and TS_54, extending along the first direction for transmitting sensing signals generated on the touch sensor pads. According to an embodiment of the invention, the traces TS_51, TS_52, TS_53 and TS_54 may be sequentially configured along a second direction. The second direction may be a row direction or a horizontal direction on the drawing, and the second direction may be perpendicular to the first direction.

The panel device 500 may further comprise multiplexers MUX_51 and MUX_52. In this embodiment, the multiplexers MUX_51 and MUX_52 may be 2-to-1 multiplexers, that is, N=2, and a touch sensing interval may comprise 2 sensing periods. In this embodiment, the fan-out area of the panel device 500 may further comprise a wiring structure 570. The wiring structure 570 may comprise a plurality of wires extending along the second direction, such as the wires 571 and 572 drawn by bolder lines in FIG. 5, and the wires connect a portion of the traces. For example, the wire 571 connects the trace TS_52 to an input terminal of the multiplexer MUX_52, and the wire 572 connects the trace TS_53 to an input terminal of the multiplexer MUX_51.

According to an embodiment of the invention, a number of the traces may be an integer multiple of the wires comprised in the wiring structure. For example, the number of the traces may be twice the number of the wires comprised in the wiring structure, or the number of the wires comprised in the wiring structure may be half the number of the traces.

The multiplexer MUX_51 may selectively couple one of the traces TS_51 and TS_53 to the receiving circuit RX_51 in different sensing periods in response to a control signal issued by the control circuit. Similarly, the multiplexer MUX_52 may selectively couple one of the traces TS_52 and TS_54 to the receiving circuit RX_52 in different sensing periods in response to the control signal issued by the control circuit.

In this embodiment, the vias V_511, V_512 and V_513 corresponding to the touch sensor pad TP_51 may be configured on the trace TS_51, the touch sensor pad TP_51 may be coupled to the trace TS_51 through the corresponding vias V_511, V_512 and V_513, and the first sensing signal generated on the touch sensor pad TP_51 may be transmitted to the receiving circuit RX_51 through the trace TS_51.

The vias V_521, V_522 and V_523 corresponding to the touch sensor pad TP_52 may be configured on the trace TS_52, the touch sensor pad TP_52 may be coupled to the trace TS_52 through the corresponding vias V_521, V_522 and V_523, and the second sensing signal generated on the touch sensor pad TP_52 may be transmitted to the receiving circuit RX_52 through the trace TS_52 and the wire 571 in the wiring structure 570.

The vias V_531, V_532 and V_533 corresponding to the touch sensor pad TP_53 may be configured on the trace TS_53, the touch sensor pad TP_53 may be coupled to the trace TS_53 through the corresponding vias V_531, V_532 and V_533, and the third sensing signal generated on the touch sensor pad TP_53 may be transmitted to the receiving circuit RX_51 through the trace TS_53 and the wire 572 in the wiring structure 570.

The vias V_541, V_542 and V_543 corresponding to the touch sensor pad TP_54 may be configured on the trace TS_54, the touch sensor pad TP_54 may be coupled to the trace TS_54 through the corresponding vias V_541, V_542 and V_543, and the fourth sensing signal generated on the touch sensor pad TP_54 may be transmitted to the receiving circuit RX_52 through the trace TS_54.

In this embodiment, through the switching of the multiplexer MUX_51, the receiving circuit RX_51 may receive the first sensing signal generated on the touch sensor pad TP_51 (that is, generated in the region RG_51) in the first sensing period and receive the third sensing signal generated on the touch sensor pad TP_53 (that is, generated in the region RG_52) in the second sensing period. Similarly, through the switching of the multiplexer MUX_52, the receiving circuit RX_52 may receive the second sensing signal generated on the touch sensor pad TP_52 (that is, generated in the region RG_21) in the first sensing period and receive the fourth sensing signal generated on the touch sensor pad TP_54 (that is, generated in the region RG_52) in the second sensing period.

In the embodiments of the invention, the touch sensor pads configured in the same region may be coupled to their corresponding receiving circuit in the same sensing period, and their touch sensing operations can be performed at the same time (i.e., in the same sensing period) on the corresponding sensing area. In this manner, the continuity of the sensing signals can be effectively improved.

Figure 6:
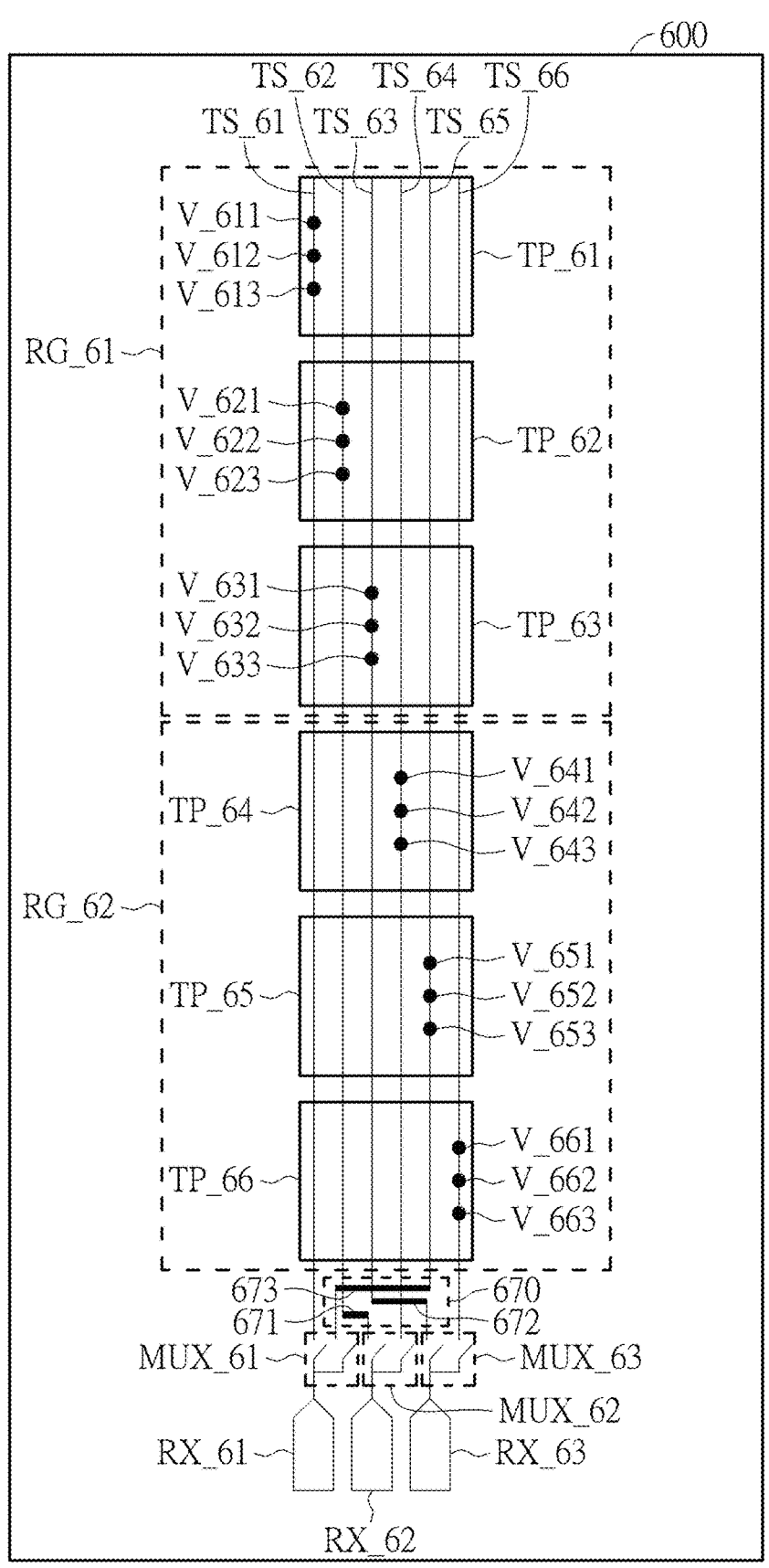
FIG. 6 is a schematic diagram of a panel device according to another embodiment in the second aspect of the invention.

FIG. 6 is a schematic diagram of a panel device according to another embodiment in the second aspect of the invention. The panel device 600 may have the same components as the panel device 100. That is, the panel device 600 may comprise a display panel, a circuit board, a display area, a fan-out area and a control circuit, etc. as shown in FIG. 1.

The main difference between FIG. 6 and FIG. 5 is the number of components. In FIG. 6, the first group of touch sensor pads may comprise touch sensor pads TP_61, TP_62 and TP_63 configured in the region RG_61, the second group of touch sensor pads may comprise touch sensor pads TP_64, TP_65 and TP_66 configured in the region RG_62, wherein the touch sensor pads TP_61-TP_66 may be located in the same column (e.g., the first column) of the sensor array, and may be sequentially configured along a first direction.

The panel device 600 may further comprise a plurality of receiving circuits, such as receiving circuits RX_61, RX_62 and RX_63, in the control circuit and a plurality of traces, such as traces TS_61, TS_62, TS_63, TS_64, TS_65 and TS_66, extending along the first direction for transmitting sensing signals generated on the touch sensor pads. According to an embodiment of the invention, the traces TS_61-TS_66 may be sequentially configured along a second direction. The second direction may be a row direction or a horizontal direction on the drawing, and the second direction may be perpendicular to the first direction.

In this embodiment, the multiplexers MUX_61, MUX_62 and MUX_63 may be 2-to-1 multiplexers, that is, N=2, and a touch sensing interval may comprise 2 sensing periods. In addition, in this embodiment, the fan-out area of the panel device 600 may further comprise a wiring structure 670. The wiring structure 670 may comprise a plurality of wires extending along the second direction, such as the wires 671, 672 and 673 drawn by bolder lines in FIG. 6, and the wires connect a portion of the traces. For example, the wire 671 connects the trace TS_62 to an input terminal of the multiplexer MUX_62, the wire 672 connects the trace TS_63 to an input terminal of the multiplexer MUX_63, and the wire 673 connects the trace TS_65 to an input terminal of the multiplexer MUX_61.

According to an embodiment of the invention, a number of the traces may be an integer multiple of the wires comprised in the wiring structure. For example, the number of the traces may be twice the number of the wires comprised in the wiring structure, or the number of the wires comprised in the wiring structure may be half the number of the traces.

The multiplexer MUX_61 may selectively couple one of the traces TS_61 and TS_65 to the receiving circuit RX_61 in different sensing periods in response to a control signal issued by the control circuit. The multiplexer MUX_62 may selectively couple one of the traces TS_62 and TS_64 to the receiving circuit RX_62 in different sensing periods in response to the control signal issued by the control circuit. The multiplexer MUX_63 may selectively couple one of the traces TS_63 and TS_66 to the receiving circuit RX_63 in different sensing periods in response to the control signal issued by the control circuit.

In this embodiment, the vias V_611, V_612 and V_613 corresponding to the touch sensor pad TP_61 may be configured on the trace TS_61, the touch sensor pad TP_61 may be coupled to the trace TS_61 through the corresponding vias V_611, V_612 and V_613, and the first sensing signal generated on the touch sensor pad TP_61 may be transmitted to the receiving circuit RX_61 through the trace TS_61.

The vias V_621, V_622 and V_623 corresponding to the touch sensor pad TP_62 may be configured on the trace TS_62, the touch sensor pad TP_62 may be coupled to the trace TS_62 through the corresponding vias V_621, V_622 and V_623, and the second sensing signal generated on the touch sensor pad TP_62 may be transmitted to the receiving circuit RX_62 through the trace TS_62 and the wire 671 in the wiring structure 670.

The vias V_631, V_632 and V_633 corresponding to the touch sensor pad TP_63 may be configured on the trace TS_63, the touch sensor pad TP_63 may be coupled to the trace TS_63 through the corresponding vias V_631, V_632 and V_633, and the third sensing signal generated on the touch sensor pad TP_63 may be transmitted to the receiving circuit RX_63 through the trace TS_63 and the wire 672 in the wiring structure 670.

The vias V_641, V_642 and V_643 corresponding to the touch sensor pad TP_64 may be configured on the trace TS_64, the touch sensor pad TP_64 may be coupled to the trace TS_64 through the corresponding vias V_641, V_642 and V_643, and the fourth sensing signal generated on the touch sensor pad TP_64 may be transmitted to the receiving circuit RX_62 through the trace TS_64.

The vias V_651, V_652 and V_653 corresponding to the touch sensor pad TP_65 may be configured on the trace TS_65, the touch sensor pad TP_65 may be coupled to the trace TS_65 through the corresponding vias V_651, V_652 and V_653, and the fifth sensing signal generated on the touch sensor pad TP_65 may be transmitted to the receiving circuit RX_61 through the trace TS_65 and the wire 673 in the wiring structure 670.

The vias V_661, V_662 and V_663 corresponding to the touch sensor pad TP_66 may be configured on the trace TS_66, the touch sensor pad TP_66 may be coupled to the trace TS_66 through the corresponding vias V_661, V_662 and V_663, and the sixth sensing signal generated on the touch sensor pad TP_66 may be transmitted to the receiving circuit RX_63 through the trace TS_66.

In this embodiment, through the switching of the multiplexer MUX_61, the receiving circuit RX_61 may receive the first sensing signal generated on the touch sensor pad TP_61 (that is, generated in the region RG_61) in the first sensing period and receive the fifth sensing signal generated on the touch sensor pad TP_65 (that is, generated in the region RG_62) in the second sensing period. Through the switching of the multiplexer MUX_62, the receiving circuit RX_62 may receive the second sensing signal generated on the touch sensor pad TP_62 (that is, generated in the region RG_61) in the first sensing period and receive the fourth sensing signal generated on the touch sensor pad TP_64 (that is, generated in the region RG_62) in the second sensing period. Through the switching of the multiplexer MUX_63, the receiving circuit RX_63 may receive the third sensing signal generated on the touch sensor pad TP_63 (that is, generated in the region RG_61) in the first sensing period and receive the sixth sensing signal generated on the touch sensor pad TP_66 (that is, generated in the region RG_62) in the second sensing period. In the embodiments of the invention, the touch sensor pads configured in the same region may be coupled to their corresponding receiving circuit in the same sensing period, and their touch sensing operations can be performed at the same time (i.e., in the same sensing period) on the corresponding sensing area. In this manner, the continuity of the sensing signals can be effectively improved.

In embodiments of the invention, although there may be some difference in the fan-out resistance values at the junctions of different regions, the change in resistive-capacitive loading caused by this difference will not be large enough to affect the accuracy of the touch sensing. Therefore, the proposed circuit structure of the panel device can still accurately sense the touch behavior of the panel.

In addition, the proposed circuit structure of the panel device can not only be applied to the panel devices with extended traces (for example, all traces are extended from the fan-out area to the top of the display area as the exemplary panel devices shown FIG. 2-FIG. 6), but also be applied to the panel devices with non-extended traces.

Figure 7:
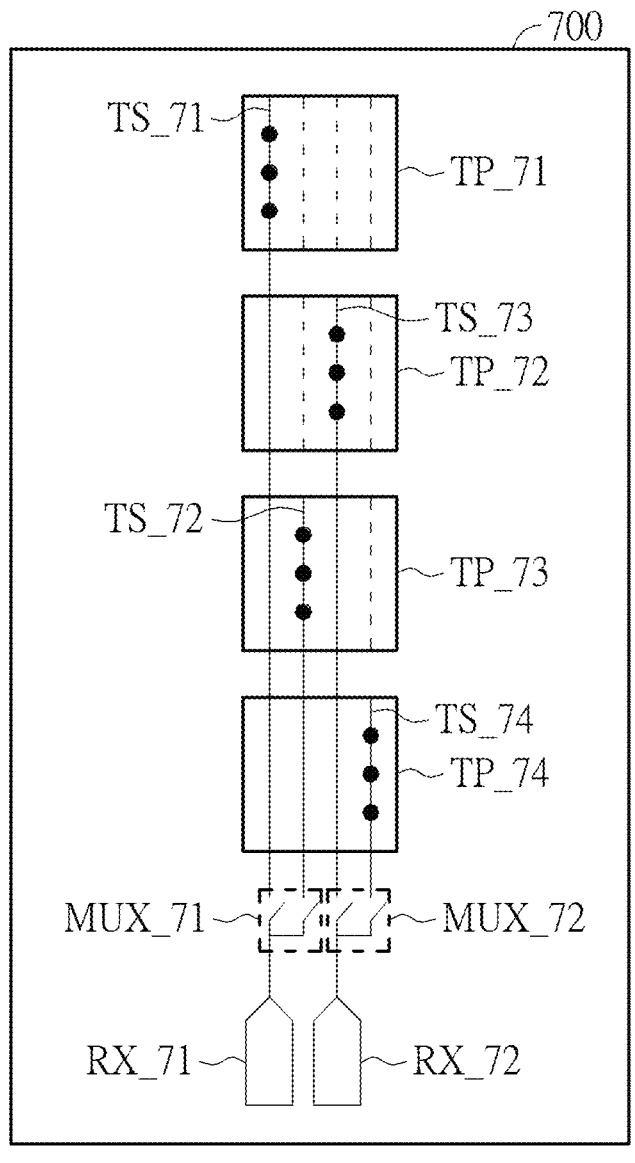
FIG. 7 is a schematic diagram of a panel device according to an embodiment of the invention.

FIG. 7 is a schematic diagram of a panel device according to an embodiment of the invention. The panel device 700 may have the same components as the panel device 100. That is, the panel device 700 may comprise a display panel, a circuit board, a display area, a fan-out area and a control circuit, etc. as shown in FIG. 1.

In this embodiment, the multiplexers MUX_71 and MUX_72 may be 2-to-1 multiplexers, that is, N=2, and a touch sensing interval may comprise 2 sensing periods. The main difference between FIG. 7 and FIG. 2 is whether the trace is extended to the top of the display area. Therefore, for the descriptions regarding the touch sensor pads TP_71, TP_72, TP_73 and TP_74, the traces TS_71, TS_72, TS_73 and TS_74, the multiplexers MUX_71 and MUX_72, the receiving circuits RX_71 and RX_72, and the regions and the vias, reference may be made to the descriptions regarding the related components shown in FIG. 2, and are omitted here for brevity.

In this embodiment, each trace only extends from the receiving circuit to the corresponding touch sensor pad, and is coupled to the corresponding touch sensor pad through the via(s) configured on the trace. In some embodiments, for layout consistency, dummy trace may also be configured for the touch sensor pads. For example, the solid line extending along the first direction in FIG. 7 represents the actual traces that can transmit sensing signals, and the dotted lines extending along the first direction represents dummy traces. One or more vias may still be configured on the corresponding dummy traces, so that the traces are electrically connected to the corresponding touch sensor pads, but the dummy traces will not be connected to the receiving circuit.

For the panel devices with non-extended traces, since the actual number of traces configured corresponding to each touch sensor pad may be different, it may be necessary to adjust the value of the sensing signal accordingly to compensate for the difference caused by the different number of traces. But this does not affect the implementation of the invention. In other words, the proposed circuit structure of the panel device can also be applied to the panel devices with non-extending traces.

In addition, it should be noted that although FIG. 7 illustrates the case where the concept in the first aspect of the invention is applied to a panel device with non-extending traces, the invention is not limited thereto. The concept in the second aspect of the invention can also be applied to the panel devices with non-extending traces. Those of ordinary skill in the art would be able to deduce the design of panel traces when applying the concept in the second aspect of the invention to the panel devices with non-extending traces based on the content shown in FIG. 7 and related descriptions given above, and thus the descriptions are omitted here for brevity.

Figure 8:
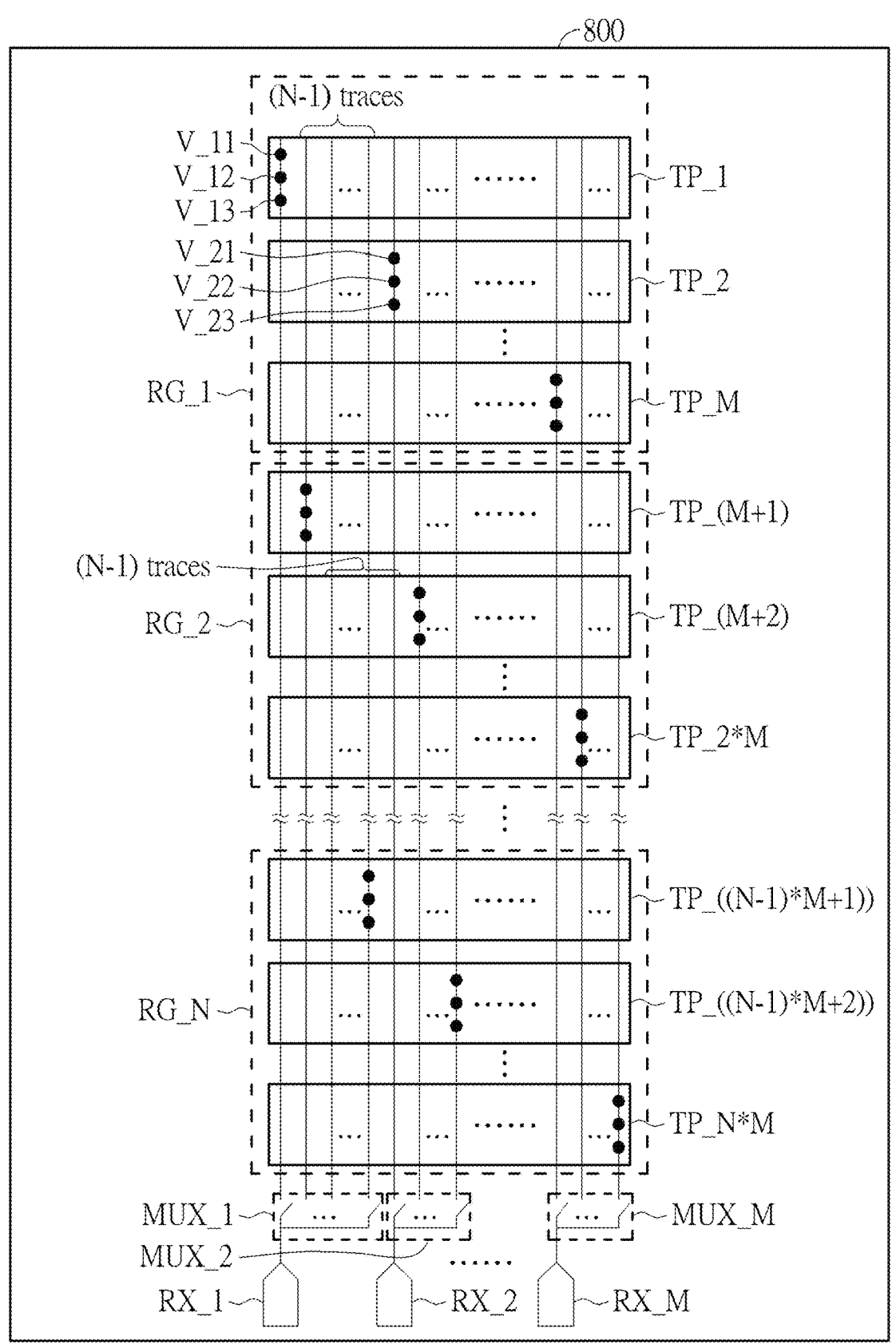
FIG. 8 is a schematic diagram of a panel device according to an embodiment of the invention.

FIG. 8 is a schematic diagram of a panel device according to an embodiment of the invention. The panel device 800 may comprise a plurality of touch sensor pads arranged in a plurality of columns and a plurality of rows, forming a sensor array, and may have the same components as the panel device 100. That is, the panel device 800 may comprise a display panel, a circuit board, a display area, a fan-out area and a control circuit, etc. as shown in FIG. 1. To simplify the illustration, FIG. 8 only shows one column of the sensor array, and the circuits and touch sensing operations of this column of touch sensor pads will be introduced in the following embodiments. It will no doubt become obvious to those of ordinary skill in the art after reading the following detailed description of the embodiments to deduce the circuits and touch sensing operations of the touch sensor pads in other columns of the sensor array, including the via configurations and the sequence of sensing signal transmission, and also the others.

FIG. 8 illustrates an example of applying M N-to-1 multiplexers in a panel device, where N and M are integers. The touch sensor pads comprise N groups of touch sensor pads sequentially configured in different regions along the first direction, and each group of touch sensor pads is configured in a corresponding region. For example, the touch sensor pads may comprise a first group of touch sensor pads concentrated in the region RG_1, a second group of touch sensor pads concentrated in the region RG_2, . . . and an N-th group of touch sensor pads concentrated in the region RG_N. In this example, the touch sensor pads TP_1, TP_2, . . . , TP_M, TP_(M+1), TP_(M+2), . . . , TP_2*M, . . . , TP_N*M are located in the same column of the sensor array (e.g., the first column), and are sequentially configured along the first direction, where the first direction may be a column direction or a vertical direction on the drawing.

The panel device 800 may further comprise a plurality of receiving circuits, such as the receiving circuits RX_1, RX_2, . . . , RX_M, and a plurality of multiplexers, such as the multiplexers MUX_1, MUX_2, . . . , MUX_M, in the control circuit, and a plurality of traces extending along the first direction for transmitting the sensing signals generated on the touch sensor pads.

The multiplexer MUX_1 may comprise an output terminal coupled to the receiving circuit RX_1 and N input terminals coupled to different traces. The multiplexer MUX_2 may comprise an output terminal coupled to the receiving circuit RX_2 and N input terminals coupled to different traces. The multiplexer MUX_M may comprise an output terminal coupled to the receiving circuit RX_M and N input terminals coupled to different traces, and so on.

In this embodiment, a touch sensing interval may comprise N sensing periods. The multiplexers MUX_1, MUX_2, . . . , MUX_M may selectively couple different traces to the corresponding receiving circuits RX_1, RX_2, . . . , RX_M in different sensing periods in response to the control signal issued by the control circuit.

According to an embodiment of the invention, configurations of the vias corresponding to two adjacent touch sensor pads in the same group of the touch sensor pads may be spaced by (N−1) of the traces. As shown in FIG. 1, configurations of the vias corresponding to the touch sensor pad TP_1 and the vias corresponding to the touch sensor pad TP_2 are spaced by (N−1) of the traces. Similarly, configurations of the vias corresponding to the touch sensor pad TP_(M+1) and the vias corresponding to the touch sensor pad TP_(M+2) are spaced by (N−1) of the traces, and the rest may be deduced by analogy.

To be more specific, the vias V_11, V_12 and V_13 corresponding to the touch sensor pad TP_1 may be configured on the first trace, and the vias V_21, V_22 and V_23 corresponding to the touch sensor pad TP_2 may be configured on the (N+1)-th trace. Therefore, configurations of the vias corresponding to the touch sensor pad TP_1 and the vias corresponding to the touch sensor pad TP_2 are spaced by (N−1) of the traces. Similarly, the vias corresponding to the touch sensor pad TP_(M+1) may be configured on the second trace, and the vias corresponding to the touch sensor pad TP_(M+2) may be configured on the (N+2)-th trace. Therefore, configurations of the vias corresponding to the touch sensor pad TP_(M+1) and the vias corresponding to the touch sensor pad TP_(M+2) are spaced by (N−1) of the traces. The rest may be deduced by analogy.

The sensing signals generated on the touch sensor pads TP_1, TP_(M+1), . . . , TP_((N–1)*M+1)) belonging to different groups may be sequentially transmitted to the receiving circuit RX_1 in different sensing periods through the corresponding traces and the switching of the multiplexer MUX_1. Similarly, the sensing signals generated on the touch sensor pads TP_2, TP_(M+2), . . . , TP_((N–1) *M+2)) belonging to different groups may be sequentially transmitted to the receiving circuit RX_2 in different sensing periods through the corresponding traces and the switching of the multiplexer MUX_2, and the sensing signals generated on the touch sensor pads TP_M, TP_2*M, . . . , TP_N*M belonging to different groups may be sequentially transmitted to the receiving circuit RX_M in different sensing periods through the corresponding traces and the switching of the multiplexer MUX_M.

Therefore, the receiving circuits RX_1, RX_2, . . . , RX_M may respectively receive the sensing signals generated on the touch sensor pads of different groups in different sensing periods through the N-to-1 multiplexers MUX_1, MUX_2, . . . , MUX_M. In addition, with the configurations of the vias which are spaced by (N–1) of the traces, the receiving circuits RX_1, RX_2, . . . , RX_M may respectively receive the sensing signals generated on the touch sensor pads of a same group in a same sensing period through the N-to-1 multiplexers MUX_1, MUX_2, . . . , MUX_M.

As described above, in the embodiments of the invention, for the panel device using the N-to-1 multiplexers, by arranging the vias to be spaced by (N–1) of the traces, the touch sensor pads configured in the same region can be coupled to their corresponding receiving circuits in the same sensing period. Therefore, the panel device performs touch sensing operations in the corresponding sensing areas at the same time by using the touch sensor pads that are positioned closely or configured concentratedly. In this manner, the continuity of the sensing signals can be effectively improved.

In the embodiments in the first aspect and the second aspect of the invention, the continuity in characteristic of the capacitance is effectively improved through the novel via configurations and the novel trace structure in the fan-out area, thereby improving the continuity of the sensing signals. In addition, the embodiments in the first aspect of the invention additionally have the design advantages since they do not need to change the routing of the traces in the fan-out area, nor does it need to change the design of the multiplexer, even nor does it affect the design and width of the border area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A panel device, comprising:
a first touch senor pad and a second touch sensor pad, sequentially configured along a first direction in a first region of the panel device;
a third touch senor pad and a fourth touch sensor pad, sequentially configured along the first direction in a second region of the panel device;
a plurality of traces, extending along the first direction, transmitting a first sensing signal generated on the first touch senor pad, transmitting a second sensing signal generated on the second touch senor pad, transmitting a third sensing signal generated on the third touch senor pad and transmitting a fourth sensing signal generated on the fourth touch senor pad, wherein the traces comprise a first trace, a second trace, a third trace and a fourth trace sequentially configured along a second direction;
a first receiving circuit, receiving the first sensing signal in a first sensing period and receiving the third sensing signal in a second sensing period;
a first via, a second via, a third via and a fourth via, respectively corresponding to the first touch sensor pad, the second touch sensor pad, the third touch sensor pad and the fourth touch sensor pad, and respectively configured on one of the traces,
wherein a touch sensing interval of the panel device comprises N sensing periods, N is a positive integer, configurations of the first via and the second via are spaced by (N–1) of the traces and configurations of the third via and the fourth via are spaced by (N–1) of the traces; and
a second receiving circuit, receiving the second sensing signal in the first sensing period and receiving the fourth sensing signal in the second sensing period,
wherein the first region and the second region are comprised in a display area of the panel device.

2. The panel device of claim 1, further comprising:
a sensor array, comprising a plurality of touch sensor pads arranged in a plurality of columns and a plurality of rows, wherein the first touch sensor pad, the second touch sensor pad, the third touch sensor pad and the fourth touch sensor pad are located in a first column of the sensor array.

3. The panel device of claim 1, further comprising:
a first multiplexer, selectively coupling one of the first trace and the second trace to the first receiving circuit in different sensing periods in response to a control signal; and
a second multiplexer, selectively coupling one of the third trace and the fourth trace to the second receiving circuit in different sensing periods in response to the control signal,
wherein the first touch sensor pad is coupled to the first trace through the first via, the second touch sensor pad is coupled to the third trace through the second via, the third touch sensor pad is coupled to the second trace through the third via, and the fourth touch sensor pad is coupled to the fourth trace through the fourth via.

4. The panel device of claim 3, further comprising:
a fifth touch senor pad, located in the first column of the sensor array and configured in the first region;
a sixth touch senor pad, located in the first column of the sensor array and configured in the second region;
a fifth via, corresponding to the fifth touch senor pad;
a six via, corresponding to the sixth touch senor pad;
a third receiving circuit, receiving a fifth sensing signal generated on the fifth touch senor pad in the first sensing period and receiving a sixth sensing signal generated on the sixth touch senor pad in the second sensing period; and
a third multiplexer, selectively coupling one of a fifth trace and a sixth trace to the third receiving circuit in different sensing periods in response to the control signal,
wherein the fifth touch sensor pad is coupled to the fifth trace through the fifth via, and the sixth touch sensor pad is coupled to the sixth trace through the sixth via.

5. The panel device of claim 1, further comprising:

a fifth touch senor pad, located in the first column of the sensor array and configured in a third region of the panel device;

a sixth touch senor pad, located in the first column of the sensor array and configured in the third region;

a fifth via, corresponding to the fifth touch senor pad;

a six via, corresponding to the sixth touch senor pad; and a fifth trace and a sixth trace, consecutively configured along the second direction, wherein the first touch sensor pad is coupled to the first trace through the first via, the second touch sensor pad is coupled to the fourth trace through the second via, the third touch sensor pad is coupled to the second trace through the third via, the fourth touch sensor pad is coupled to the fifth trace through the fourth via, the fifth touch sensor pad is coupled to the third trace through the fifth via and the sixth touch sensor pad is coupled to the sixth trace through the sixth via.

6. The panel device of claim 5, wherein the first receiving circuit and the second receiving circuit further respectively receives a fifth sensing signal generated on the fifth touch senor pad and a sixth sensing signal generated on the sixth touch senor pad in a third sensing period, and wherein the e panel device further comprises:

a first multiplexer, selectively coupling one of the first trace, the second trace and the third trace to the first receiving circuit in different sensing periods in response to a control signal; and a second multiplexer, selectively coupling one of the fourth trace, the fifth trace and the sixth trace to the second receiving circuit in different sensing periods in response to the control signal.

7. The panel device of claim 2, further comprising:

a first via, a second via, a third via and a fourth via, respectively corresponding to the first touch sensor pad, the second touch sensor pad, the third touch sensor pad and the fourth touch sensor pad, and respectively configured on one of the traces;

a first multiplexer, selectively coupling one of the first trace and the third trace to the first receiving circuit in different sensing periods in response to a control signal; and a second multiplexer, selectively coupling one of the second trace and the fourth trace to the second receiving circuit in different sensing periods in response to the control signal, wherein the first touch sensor pad is coupled to the first trace through the first via, the second touch sensor pad is coupled to the second trace through the second via, the third touch sensor pad is coupled to the third trace through the third via, and the fourth touch sensor pad is coupled to the fourth trace through the fourth via.

8. The panel device of claim 7, further comprising:

a fan-out area, comprising a wiring structure, wherein the wiring structure comprises a plurality of wires extending along the second direction and the wires connect a portion of the traces.

9. A panel device, comprising:

a sensor array, in a display area of the panel device and comprising a plurality of touch sensor pads arranged in a plurality of columns and a plurality of rows, wherein the touch sensor pads comprise a first group of touch sensor pads configured in a first region and a second group of touch sensor pads configured in a second region, the first group of touch sensor pads and the second group of touch sensor pads are located in a first column of the sensor array and sequentially configured along a first direction;

a first receiving circuit; and a second receiving circuit, wherein the first receiving circuit and the second receiving circuit respectively receives a first sensing signal and a second sensing signal generated in the first region in a first sensing period, and the first receiving circuit and the second receiving circuit respectively receives a third sensing signal and a fourth sensing signal generated in the second region in a second sensing period;

wherein the first group of touch sensor pads comprises a first touch sensor pad and a second touch sensor pad, the second group of touch sensor pads comprises a third touch sensor pad and a fourth touch sensor pad, and the panel device further comprises:

a plurality of traces, extending along the first direction and transmitting the first sensing signal, the second sensing signal generated, the third sensing signal and the fourth sensing signal;

a first via and a second via, respectively corresponding to the first touch sensor pad and the second touch sensor pad and respectively coupled to one of the traces; and a third via and a fourth via, respectively corresponding to the third touch sensor pad and the fourth touch sensor pad and respectively coupled to one of the traces, wherein a touch sensing interval of the panel device comprises N sensing periods, N is a positive integer, configurations of the first via and the second via are spaced by (N−1) of the traces and configurations of the third via and the fourth via are spaced by (N−1) of the traces.

10. The panel device of claim 9, wherein the traces comprise a first trace, a second trace, a third trace and a fourth trace sequentially configured along a second direction, the first touch sensor pad is coupled to the first trace through the first via, the first sensing signal is generated on the first touch sensor pad and is transmitted to the first receiving circuit through the first trace, the second touch sensor pad is coupled to the third trace through the second via, the second sensing signal is generated on the second touch sensor pad and is transmitted to the second receiving circuit through the third trace, the third touch sensor pad is coupled to the second trace through the third via, the third sensing signal is generated on the third touch sensor pad and is transmitted to the first receiving circuit through the second trace, the fourth touch sensor pad is coupled to the fourth trace through the fourth via, and the fourth sensing signal is generated on the fourth touch sensor pad and is transmitted to the second receiving circuit through the fourth trace.

11. The panel device of claim 10, further comprising:

a first multiplexer, selectively coupling one of the first trace and the second trace to the first receiving circuit in different sensing periods in response to a control signal; and a second multiplexer, selectively coupling one of the third trace and the fourth trace to the second receiving circuit in different sensing periods in response to the control signal.

12. The panel device of claim 11, wherein the first group of touch sensor pads further comprises a fifth touch sensor pad, the second group of touch sensor pads further comprises a sixth touch sensor pad, the traces further comprise a fifth trace and a sixth trace consecutively configured along the second direction, and the panel device further comprise:

a fifth via, corresponding to the fifth touch senor pad;

a six via, corresponding to the sixth touch senor pad;

a third receiving circuit, receiving a fifth sensing signal generated on the fifth touch senor pad in the first sensing period and receiving a sixth sensing signal generated on the sixth touch senor pad in the second sensing period; and a third multiplexer, selectively coupling one of the fifth trace and the sixth trace to the third receiving circuit in different sensing periods in response to the control signal, wherein the fifth touch sensor pad is coupled to the fifth trace through the fifth via, and the sixth touch sensor pad is coupled to the sixth trace through the sixth via.

13. The panel device of claim 9, wherein the touch sensor pads further comprises a third group of touch sensor pads configured in a third region, the third group of touch sensor pads is located in the first column of the sensor array and comprises a fifth touch sensor pad and a sixth touch sensor pad, the traces comprise a first trace, a second trace, a third trace, a fourth trace, a fifth trace and a sixth trace sequentially configured along a second direction, and the panel device further comprise:

a fifth via and a six via, respectively corresponding to the fifth touch senor pad and the sixth touch senor pad, and respectively coupled to one of the traces, wherein the first touch sensor pad is coupled to the first trace through the first via, the second touch sensor pad is coupled to the fourth trace through the second via, the third touch sensor pad is coupled to the second trace through the third via, the fourth touch sensor pad is coupled to the fifth trace through the fourth via, the fifth touch sensor pad is coupled to the third trace through the fifth via and the sixth touch sensor pad is coupled to the sixth trace through the sixth via.

14. The panel device of claim 13, wherein the first receiving circuit and the second receiving circuit further respectively receives a fifth sensing signal and a sixth sensing signal generated in the third region in a third sensing period, and wherein the panel device further comprises:

a first multiplexer, selectively coupling one of the first trace, the second trace and the third trace to the first receiving circuit in different sensing periods in response to a control signal; and a second multiplexer, selectively coupling one of the fourth trace, the fifth trace and the sixth trace to the second receiving circuit in different sensing periods in response to the control signal.

15. The panel device of claim 9, wherein the panel device further comprises:

a first multiplexer, selectively coupling one of the first trace and the third trace to the first receiving circuit in different sensing periods in response to a control signal; and a second multiplexer, selectively coupling one of the second trace and the fourth trace to the second receiving circuit in different sensing periods in response to the control signal, wherein the first touch sensor pad is coupled to the first trace through the first via, the first sensing signal is generated on the first touch sensor pad and is transmitted to the first receiving circuit through the first trace, the second touch sensor pad is coupled to the second trace through the second via, the second sensing signal is generated on the second touch sensor pad and is transmitted to the second receiving circuit through the second trace, the third touch sensor pad is coupled to the third trace through the third via, the third sensing signal is generated on the third touch sensor pad and is transmitted to the first receiving circuit through the third trace, the fourth touch sensor pad is coupled to the fourth trace through the fourth via, and the fourth sensing signal is generated on the fourth touch sensor pad and is transmitted to the second receiving circuit through the fourth trace.

16. The panel device of claim 15, further comprising:

a fan-out area, comprising a wiring structure, wherein the wiring structure comprises a plurality of wires extending along the second direction and the wires connect a portion of the traces.

17. A panel device, comprising:

a sensor array, in a display area of the panel device and comprising a plurality of touch sensor pads arranged in a plurality of columns and a plurality of rows;

a plurality of traces, extending along a first direction and transmitting a plurality of sensing signals generated on the touch senor pads;

a first N-to-1 multiplexer, comprising an output terminal and N input terminals coupled to different traces, wherein N is a positive integer greater than 1;

a second N-to-1 multiplexer, comprising an output terminal and N input terminals coupled to different traces;

a first receiving circuit, coupled to the output terminal of the first N-to-1 multiplexer;

a second receiving circuit, coupled to the output terminal of the second N-to-1 multiplexer; and a plurality of vias, each corresponding to one of the touch sensor pads and configured on one of the traces;

wherein the touch sensor pads comprise N groups of touch sensor pads sequentially configured in different regions along the first direction, each group of touch sensor pads is configured in a corresponding region, the first receiving circuit and the second receiving circuit respectively receives the sensing signals generated on the touch sensor pads of different groups in different sensing periods through the first N-to-1 multiplexer and the second N-to-1 multiplexer, and the first receiving circuit and the second receiving circuit respectively receives the sensing signals generated on the touch sensor pads of a same group in a same sensing period through the first N-to-1 multiplexer and the second N-to-1 multiplexer;

wherein configurations of the vias corresponding to two adjacent touch sensor pads in the same group of the touch sensor pads are spaced by $(N-1)$ of the traces.

* * * * *